(12) United States Patent
Shin et al.

(10) Patent No.: US 6,614,485 B2
(45) Date of Patent: Sep. 2, 2003

(54) DEINTERLACING APPARATUS

(75) Inventors: Chang Yong Shin, Seoul (KR); Dong Il Han, Seoul (KR)

(73) Assignee: LG Electronics Inc., Seoul (KR)

( * ) Notice: Subject to any disclaimer, the term of this patent is extended or adjusted under 35 U.S.C. 154(b) by 392 days.

(21) Appl. No.: 09/758,419

(22) Filed: Jan. 12, 2001

(65) Prior Publication Data

US 2001/0015768 A1 Aug. 23, 2001

(30) Foreign Application Priority Data

Jan. 12, 2000 (KR) .......................................... 2000-1331

(51) Int. Cl.[7] ................................................. H04N 7/01
(52) U.S. Cl. ...................................... 348/452; 348/448
(58) Field of Search ................................ 348/448, 452, 348/441, 458, 459; H04N 7/01, 11/20

(56) References Cited

U.S. PATENT DOCUMENTS 5,027,201 A * 6/1991 Bernard ....................... 348/452
5,159,451 A * 10/1992 Faroudja et al. ............ 348/448
6,118,489 A * 9/2000 Han et al. .................... 348/452

* cited by examiner

*Primary Examiner*—Sherrie Hsia
(74) *Attorney, Agent, or Firm*—Birch, Stewart, Kolasch & Birch, LLP.

(57) ABSTRACT

The present invention relates to an interpolation technology adapted to a picture motion, in particular to a deinterlacing apparatus which is capable of performing accurate motion detection by finding each BD by using an initial detection value when a BD and a BPPD used for the motion detection are detected and performing low pass filtering in order to remove high frequency noise element, improving picture quality by showing motion alteration degree smoothly, and reducing manufacture cost of a circuit to be implemented by simplifying the circuit.

14 Claims, 6 Drawing Sheets

ODD FIELD     EVEN FIELD

DEINTERLACING APPARATUS

BACKGROUND OF THE INVENTION

1. Field of the Invention

The present invention relates to an interpolation technology adapted to a picture motion, in particular to a deinterlacing apparatus which is capable of improving definition of a picture by performing edge direction detection and pixel interpolation.

2. Description of the Prior Art

In the conventional image processing method, a deinterlacing method is a method converting an interlaced scanning type image signal into a progressive scanning type image signal. It will now be described with reference to accompanying FIGS. 1 and 2A~2C.

FIG. 1 illustrates a picture in accordance with the general interlacing method.

As depicted in FIG. 1, in the interlaced scanning type image data, a picture of one frame is implemented with an odd field and an even field, namely, two fields.

However, according to a type of a display apparatus, a picture is implemented by processing the interlaced scanning type image signal as a progressive scanning type image signal used in a computer monitor etc. without processing it as the interlaced scanning type image signal.

Herein, in order to process the interlaced scanning type image signal on a display apparatus for processing the progressive scanning type image signal, an additional system for converting the interlaced scanning type image signal into the progressive scanning type image signal has to be installed inside of the display apparatus.

As depicted in FIGS. 2A~2C, a converting method for converting the interlaced scanning type image signal into the progressive scanning type image signal can be implemented many ways.

FIG. 2A illustrates a line repetition in accordance with the conventional technology.

As depicted in FIG. 2A, the line repetition implements one frame by repeating line information of the present field.

FIG. 2B illustrates an intra-field interpolation without motion-compensation in accordance with the conventional technology.

As depicted in FIG. 2B, the intra-field interpolation without motion-compensation implements one frame by inserting a former field line between the present field line.

FIG. 2C illustrates an intra-field interpolation in accordance with the conventional technology.

As depicted in FIG. 2C, the intra-field interpolation implements a new field by inserting ½ divided data of two lines into region between the two lines on one field.

The line repetition can be implemented as a simple hardware, however the image quality lowers after the interpolation using the line repetition method.

In addition, the intra-field interpolation without motion-compensation also can be implemented as a simple hardware, however a picture is deteriorated due to an error occurred in the interpolation of a motion picture.

And, the intra-field interpolation is better than the line repetition in the image quality and error occurrence aspect, however the picture is deteriorated when a still picture is interpolated.

In other words, as depicted in FIG. 2A~2C, the interpolation methods all have the image quality lowering problem after the interpolation.

Accordingly, a motion-compensation interpolation for interpolating the present picture by using field data of the former picture and field data of a picture to be implemented is suggested.

The motion-compensation interpolation divides a picture into a plurality of blocks and finds a motion vector about the each block by using timely consecutive field data on the basis of the present field data, and interpolates the present frame picture by referring the motion vector.

An image quality can be improved by the motion-compensation interpolation, however, it is implemented as a complicated hardware.

Accordingly, in order to solve the problem of the motion-compensation interpolation, a motion adaptive interpolation for interpolating a frame in accordance with a motion by assuming degree of the motion is suggested.

The motion adaptive interpolation can be implemented as a simple hardware on the comparison with the motion-compensation interpolation, and it can improve the image quality after the interpolation.

The motion adaptive interpolation comprises a Bernard method represented in the U.S. Pat. No. 5,027,201 and a Faroundja method represented in the U.S. Pat. No. 5,159,451 etc.

As described above, the conventional line repetition can be implemented as a simple hardware, however it lowers the image quality after the interpolation.

In addition, the conventional intra-field interpolation method can be implemented as a simple hardware also, however it has an error occurrence problem in the interpolation of the picture having motion or image quality lowering problem due to the deterioration.

In addition, the conventional intra-field interpolation is better than the line repetition in the image quality and error occurrence aspect, however the picture is deteriorated when a still picture is interpolated.

The conventional motion adaptive interpolation can be implemented as a simple hardware on the comparison with the motion-compensation interpolation, and it can improve the image quality after the interpolation. However, a stepped noise occurs due to a simple vertical interpolation in an edge having big motion.

In addition, the conventional motion adaptive interpolation uses a plurality of field memories and have a complicated processing process, accordingly manufacture cost of an implement circuit increases.

SUMMARY OF THE INVENTION

The object of the present invention is to provide a deinterlacing apparatus which is capable of improving definition of a picture by performing interpolation appropriately in accordance with a motion degree and an edge direction of a field to be interpolated.

The other object of the present invention is to provide a deinterlacing apparatus which is capable of detecting motion accurately by removing a high frequency noise element by performing low pass filtering after finding each BD (Bright Difference) by using an initially detected value when a BD (Brightness Difference) and a BPPD (Brightness Profile Pattern Difference) used for the motion detection are detected.

The another object of the present invention is to provide a deinterlacing apparatus which is capable of reducing manufacture cost of a circuit to be implemented by simplifying the circuit.

In order to achieve the above-described objects of the present invention, the deinerlacing apparatus in accordance with the present invention comprises a spatial interpolator for yielding intra-field interpolation pixel value with inputs of a pixel value of field data of a region to be presently interpolated and intra-field perimeter pixel value from the first field data, a temporal interpolator for yielding a field average value about a field picture to be interpolated by averaging a pixel value of the former field and a pixel value of the after field, a motion determining unit for yielding a motion degree value by yielding and comparing the BD and BPPD of the first field data, a motion expander for diffusing the motion degree yielded on the motion determining unit to the horizontal direction and vertical direction perimeter pixels hierarchically, a soft switch for mixing the interpolation pixel value yielded from the spatial interpolator in accordance with the motion degree value of the motion expander and the field average value yielded from the temporal interpolator, and a vertical line converter for converting the number of vertical lines of the present field data among the first field data so as to be appropriate to display by referring the interpolation line data on the soft switch.

In order to achieve the other object of the present invention, the BD/BPPD combiner of the present invention comprises a low pass filter for removing high frequency noise element by performing separately low-pass filtering of the BD ($BD_U$) ($BD_C$) ($BD_L$), a first maximum value detector for detecting a first maximum value among the output signals of the low pass filter, a first mapper for mapping the first maximum value as a preset value when the first maximum value is more than a preset threshold, a second maximum detector for detecting a second maximum value among the BPPD ($BPPD_U$) ($BPPD_C$) ($BPPD_L$), a second mapper for mapping the second maximum value as a preset value when the second maximum value is more than the preset threshold, and a third maximum value detector for determining the motion degree value by selecting a third maximum value among the output signals of the first and second mappers.

DETAILED DESCRIPTION OF THE PREFERRED EMBODIMENT

Figure 1:
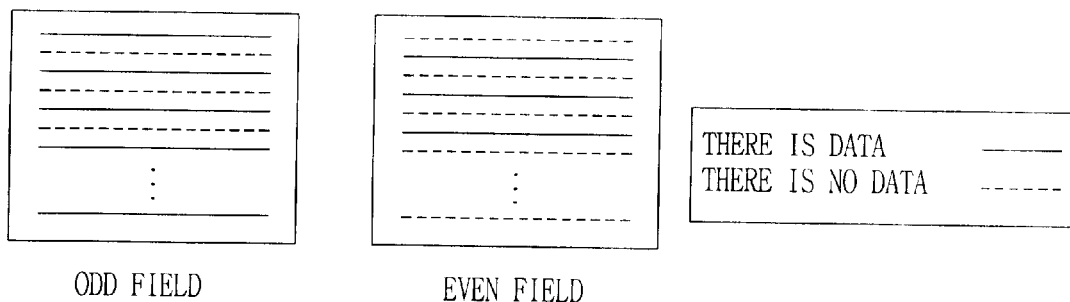
FIG. 1 illustrates a picture in accordance with the general interlacing method.
Figure 2A:
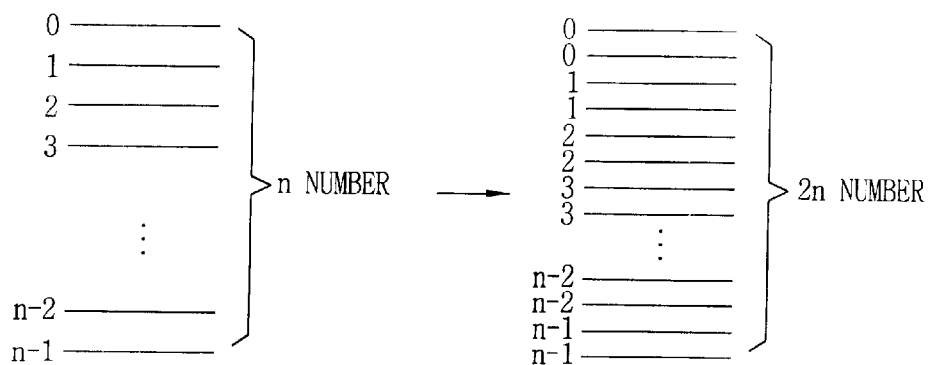
FIG. 2A illustrates a line repetition in accordance with the conventional technology.
Figure 2B:
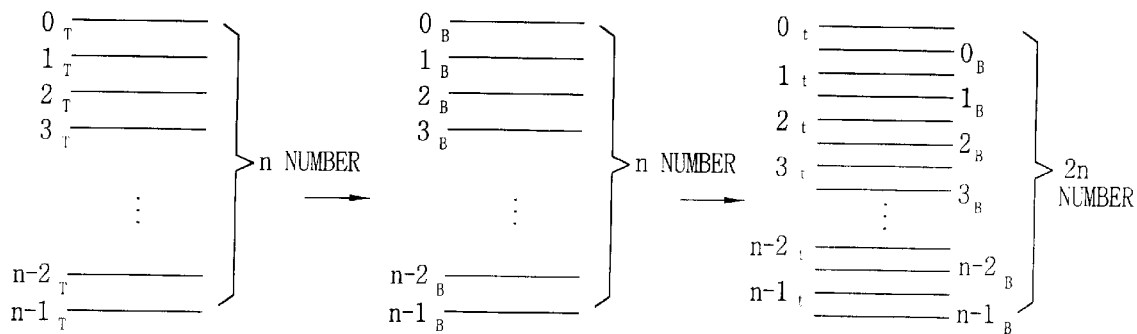
FIG. 2B illustrates an intra-field interpolation without motion-compensation in accordance with the conventional technology.
Figure 2C:
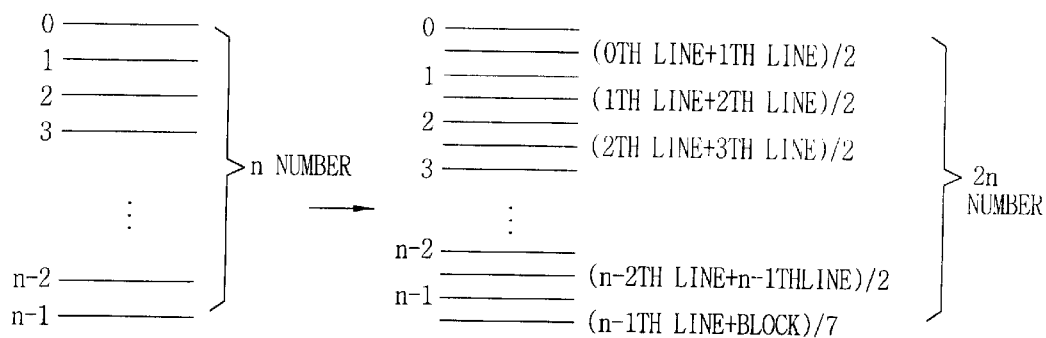
FIG. 2C illustrates an intra-field interpolation in accordance with the conventional technology.
Figure 3:
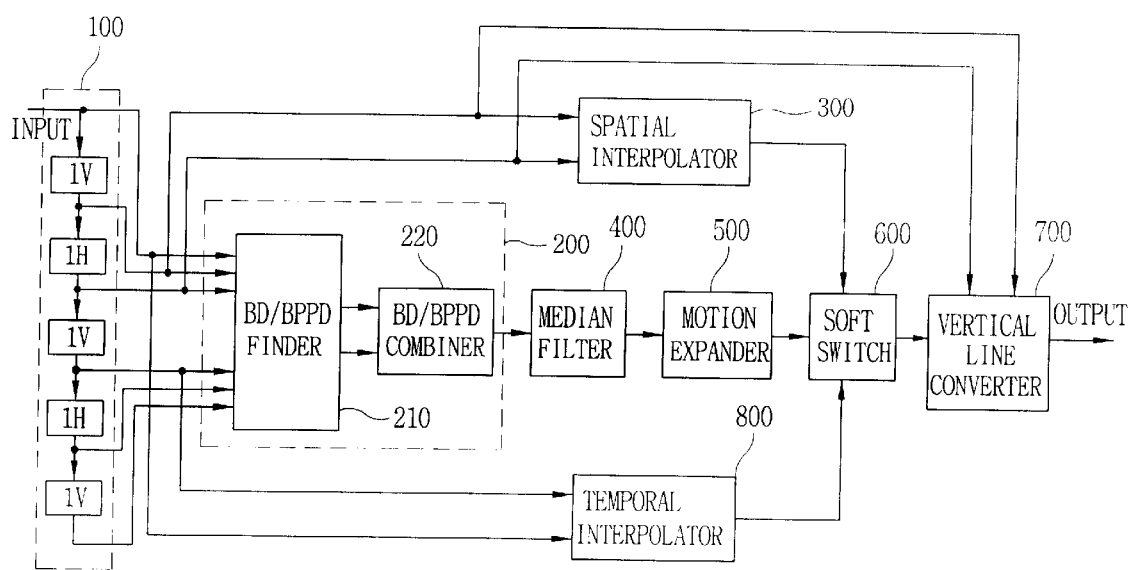
FIG. 3 is a block diagram illustrating a deinterlacing apparatus in accordance with the embodiment of the present invention.

FIG. 3 is a block diagram illustrating a deinterlacing apparatus in accordance with the embodiment of the present invention.

As depicted in FIG. 3, the deinterlacing apparatus in accordance with the present invention comprises a field storing unit 100 for storing temporal consecutive present one field data, former two field data and next one field data centering around the present field data, namely, total four field data, a spatial interpolator 300 for yielding intra-field interpolation pixel value with inputs of a pixel value of field data of a region to be presently interpolated and an intra-field perimeter pixel value from the field storing unit 100, a temporal interpolator 800 for yielding a field average value about a field picture to be interpolated by averaging a pixel value of the former field and a pixel value of the after field, a motion determining unit 200 for yielding a motion degree value by yielding and comparing the BD and BPPD of the first field data, a median filter 400 for grouping the region where the motion degree value exists by removing the noise element included in the motion degree value, a motion expander 500 for diffusing the motion degree yielded on the motion determining unit to the horizontal direction and vertical direction perimeter pixels hierarchically, a soft switch 600 for mixing the interpolation pixel value yielded from the spatial interpolator 300 in accordance with the motion degree value of the motion expander 500 and the field average value yielded from the temporal interpolator 800, and a vertical line converter 700 for converting the number of vertical lines of the present field data among the first field data so as to be appropriate to display by referring the interpolation line data on the soft switch.

In addition, the motion determining unit 200 comprises a BD/BPPD finder 210 for yielding BP and BPPD in the former field and after field by detecting the BD and BPPD of the each field data on the field storing unit 100 centering around the present field, and a BD/BPPD combiner 220 for determining a motion degree value by mapping with the preset value when the BD and BPPD are more than the preset threshold value.

The operation and operation effect of the present apparatus will now be described in detail.

First, the field storing unit 100 stores picture data corresponding to timely consecutive M number of fields such as nth picture data and former field and after field etc. centering around the present field, namely, nth field among a plurality of field data for implementing an output picture.

In other words, the field storing unit 100 stores the former and after field data including the nth field data, and provides the stored field data to the motion determining unit 200, spatial interpolator 300, and temporal interpolator 800.

Herein, the spatial interpolator 300 detects the pixel value of the nth field data corresponding to the region to be line-interpolated and the intra-field perimeter pixels with the input of the field data in the region to be interpolated from the field storing unit 100, yields an edge direction including the pixel values around the pixel to be interpolated by using the correlation of the intra-field pixels, and extracts an appropriate interpolation value in accordance with the edge direction.

In addition, the spatial interpolator 300 yields an edge direction including the perimeter pixel values around the pixel to be interpolated by using the correlation between the intra-field pixels, and extracts an appropriate interpolation value in accordance with the edge direction when the perimeter pixels are detected.

In particular, the spatial interpolator 300 extracts an interpolation value of the pixel to be interpolated by filtering the pixel values of the spatial adjacent pixels and temporal adjacent pixels from the present field to be interpolated in order to maintain the spatial consistency and temporal consistency of the pixel to be interpolated.

An edge direction detecting method by a gradient and a rule, and a region matching method represented in Korea patent No.99-26084 by the inventor of the present invention can be adapted to the spatial interpolator 300.

Meanwhile, the temporal interpolator 800 yields a field average value about a field picture to be interpolated by averaging a pixel value of the former field and a pixel value of the after field.

For example, when the jth pixel on the ith line is interpolated in order to generate newly the Nth field picture, the temporal interpolator 800 extracts the field average value by averaging the pixel value of the N−1th field data and pixel value of the N+1th field data.

In addition, the motion determining unit 200 calculates the motion degree of the moving picture by detecting a pixel value and BPPD of a certain line existed between the each field data stored on the field storing unit 100.

In other words, the motion determining unit 200 can determine the motion degree value by the BD/BPPD finder 210 for detecting the BD and BPPD of the each field data on the field storing unit 100, comparing the BD and BPPD of the former field and after field centering around the present field and yielding the BD and BPPD, and the BD/BPPD combiner 220 for inputting the yielded BD and BPPD.

Herein, the BD concept is used in a picture processing field such as a digital television etc. in order to perform the line interpolation, the BPPD concept is represented in Korea patent No.97-80719 patented by a inventor of the present invention.

In the Korea patent No.97-80719, when the motion determining unit 200 performs the line interpolation about several lines, it performs quantization of the BPPD for finding the BPPD between the former and after fields centering around a certain field, and yields the BP and BPPD.

Herein, when the BD and BPPD are more than the preset threshold, the final motion degree value is determined by mapping the BD and BPPD with the preset value and comparing it.

Hereinafter, the BD/BPPD combiner 220 represented in the Korea patent No.97-80719 by the inventor of the present invention will now be described with reference to accompanying FIG. 4.

Figure 4:
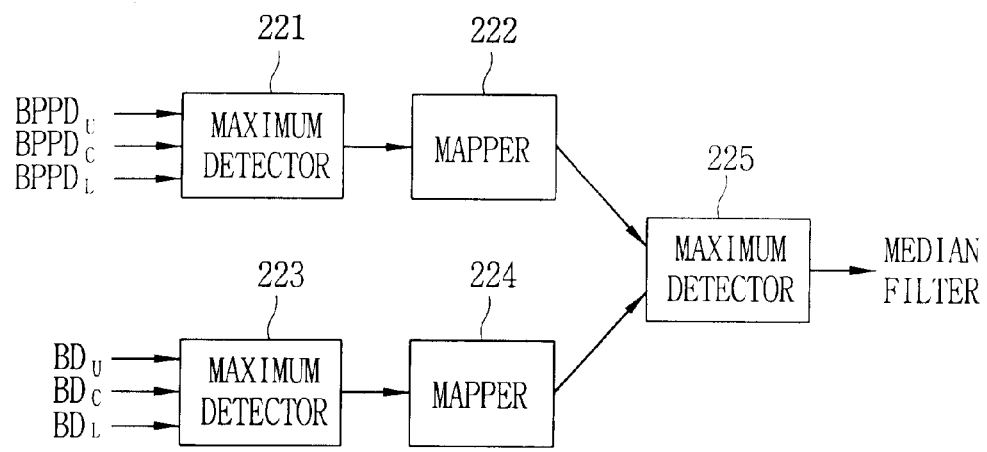
FIG. 4 illustrates blocks of a BD/BBPD combiner in order to for describe blocks of a motion expander in accordance with the embodiment of the present invention.

FIG. 4 illustrates blocks of the BD/BBPD combiner 220 in order to describe blocks of the motion expander in accordance with the embodiment of the present invention.

As depicted in FIG. 4, the BD/BPPD combiner in accordance with the present invention comprises a maximum value detector 221 for detecting a first maximum value among the BPPD ($BPPD_U$) ($BPPD_C$) ($BPPD_L$), a mapper 222 for mapping the first maximum value as a preset value when the output signal of the maximum value detector 221 is more than the preset threshold, a maximum detector 223 for detecting a maximum value among the BD ($BD_U$) ($BD_C$) ($BD_L$), a mapper 224 for mapping as the preset value when the output signal of the maximum value detector 223 is more than the preset threshold, and a maximum value detector 225 for determining the motion degree value by selecting a maximum value among the output signals of the mappers 222, 224.

However, when the picture motion is detected, the high pass filtering effect occurs in the process for finding the BD, accordingly it may generate the high frequency noise element included in the original picture.

In order to solve above-mentioned problem, the present invention performs the low pass filtering about the each BD ($BD_U$) ($BD_C$) ($BD_L$) in order to remove the high frequency noise element. Accordingly, it is possible to perform more credible motion detection.

In addition, the BD/BPPD 220 combiner 220 is constructed so as to improve the picture quality after interpolation in accordance with the motion degree by showing smooth motion alteration generally.

In addition, in the BPPD, the low pass filtering can be adapted to the BPPD as same as the BD.

Figure 5:
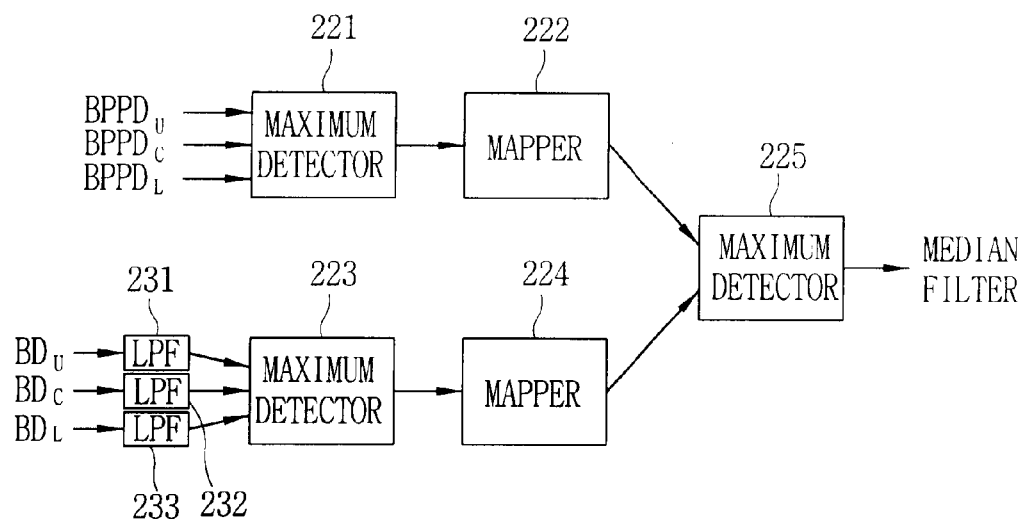
FIG. 5 illustrates blocks of a motion expander in accordance with the embodiment of the present invention.

Meanwhile, the BD/BPPD combiner 220 can be constructed as FIG. 5 on the consideration of the manufacture cost and simplicity of the hardware. The BD/BPPD combiner 220 can offset the high frequency noise element in finding the BPPD ($BPPD_U$) ($BPPD_C$) ($BPPD_L$) by comprising the low pass filtering effect.

FIG. 5 illustrates blocks of a motion expander in accordance with the embodiment of the present invention.

As depicted in FIG. 5, the BD/BPPD combiner 220 comprises a low pass filters 231~233 for removing high frequency noise element by performing separately low-pass filtering of the BD ($BD_U$) ($BD_C$) ($BD_L$), a first maximum value detector 223 for detecting a first maximum value among the output signals of the low pass filter, a first mapper 224 for mapping the first maximum value as a preset value when the first maximum value is more than a preset threshold, a second maximum value detector 221 for detecting a second maximum value among the BPPD ($BPPD_U$) ($BPPD_C$) ($BPPD_L$), a second mapper 222 for mapping the second maximum value as a preset value when the second maximum value is more than the preset threshold, and a third maximum value detector 225 for determining the motion degree value by selecting a third maximum value among the output signals of the first and second mappers 222, 224.

Meanwhile, a noise is inevitably mixed in a picture transmitted through a broadcasting channel etc. in a coding process or a transmission process.

Accordingly, the present invention comprises the median filter 400 for removing the noise element in the output value of the BD/BPPD combiner 220 and grouping the motion detected region among the pictures, and the motion expander 500 for expanding the motion degree value to the other pixel adjacent to the pixel having motion with the input of the output value on the median filter 400 in order to set the output value of the BD/BPPD combiner 220 accurately.

Herein, the motion expander 500 expands the motion degree value to the adjacent pixel, the cause will now be described.

In general, the motion of the moving picture not only performs on a certain pixel, but also pixel groups on a certain region.

Accordingly, when the motion degree value of the certain pixel is detected, it is because the noise element of the pixel or the certain pixel and adjacent perimeter pixel are in motion state.

Herein, the motion degree value corresponding to the noise element is removed already on the median filter 400, accordingly there is high possibility the perimeter pixels are in motion state.

Accordingly, the motion expander 500 expands the motion degree value outputted from the median filter 400 to the perimeter of the pixel which is detected the motion degree value.

For example, in order to perform more accurate motion detection, a technology using 4 fields picture data in time and expanding the motion to the vertical direction in space is represented in the Korea patent No.99-26084 by the inventor of the present invention.

However, in order to improve the accuracy of the motion detection of the picture, the spatial motion expansion to the vertical direction is required. It will now be described with reference to accompanying FIG. 6.

Figure 6:
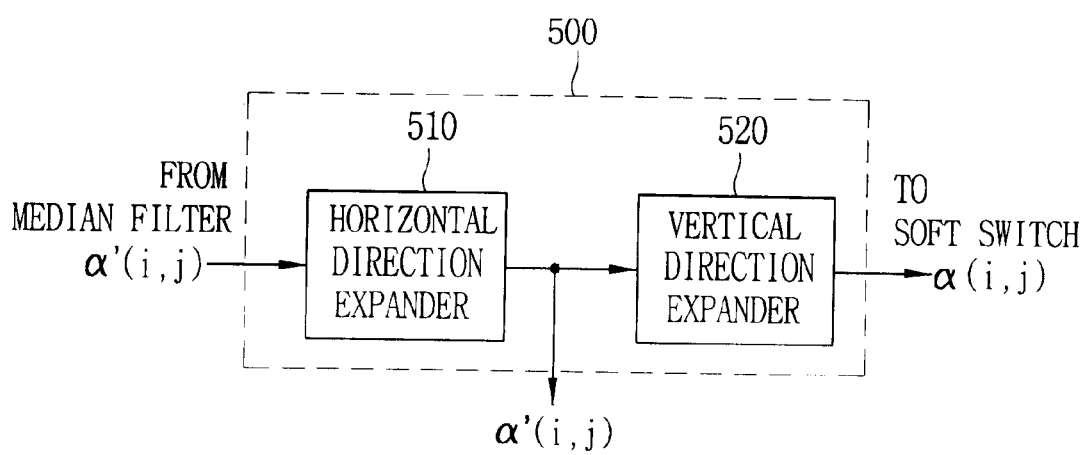
FIG. 6 illustrates blocks of a motion expander in accordance with the embodiment of the present invention.

FIG. 6 illustrates blocks of the motion expander in accordance with the embodiment of the present invention.

As depicted in FIG. 6, the motion expander 500 comprises a horizontal direction expander 510 for expanding the motion degree value to the other pixel of the horizontal direction adjacent to the pixel having motion with input of the output value of the median filter 400, and a vertical direction expander 520 for expanding the motion degree value to the other pixel of the vertical direction adjacent to the pixel having motion. It will now be described as below.

When the motion expander 500 finds the BD and BPPD about several lines from the motion determining unit 200 and detects a maximum value among the values, the vertical direction expander 520 performs the vertical direction expansion as many as the number of lines used for the motion detection, and expands the motion to the vertical direction about the more many vertical lines in order to make the interpolation possible in accordance with the stable motion degree.

In addition, the motion expander 500 is constructed so as to expand the motion degree to the vertical direction by considering the cost and simplicity of a hardware.

Herein, the horizontal direction expander 510 can be constructed as a maximum filter as described as the Korea patent No.97-80719 and No.99-26084 by the inventor of the present invention.

Accordingly, the detailed description of the horizontal direction expander 510 will be abridged, and the vertical direction expander 520 will now be described in detail.

First, the vertical direction expander 520 has two modes such as an output mode for outputting the final expanded motion degree, and a detection/storing mode for detecting and storing the motion degree of the each region about the former interpolated line of the present line to be interpolated. FIG. 8 will now be described in detail wire reference to accompanying FIG. 7.

Figure 7:
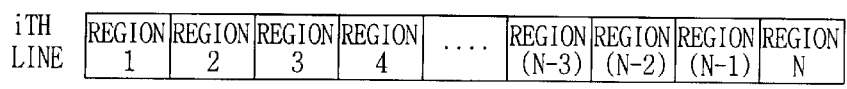
FIG. 7 illustrates N region division of a certain line in accordance with the embodiment of the present invention.
Figure 8:
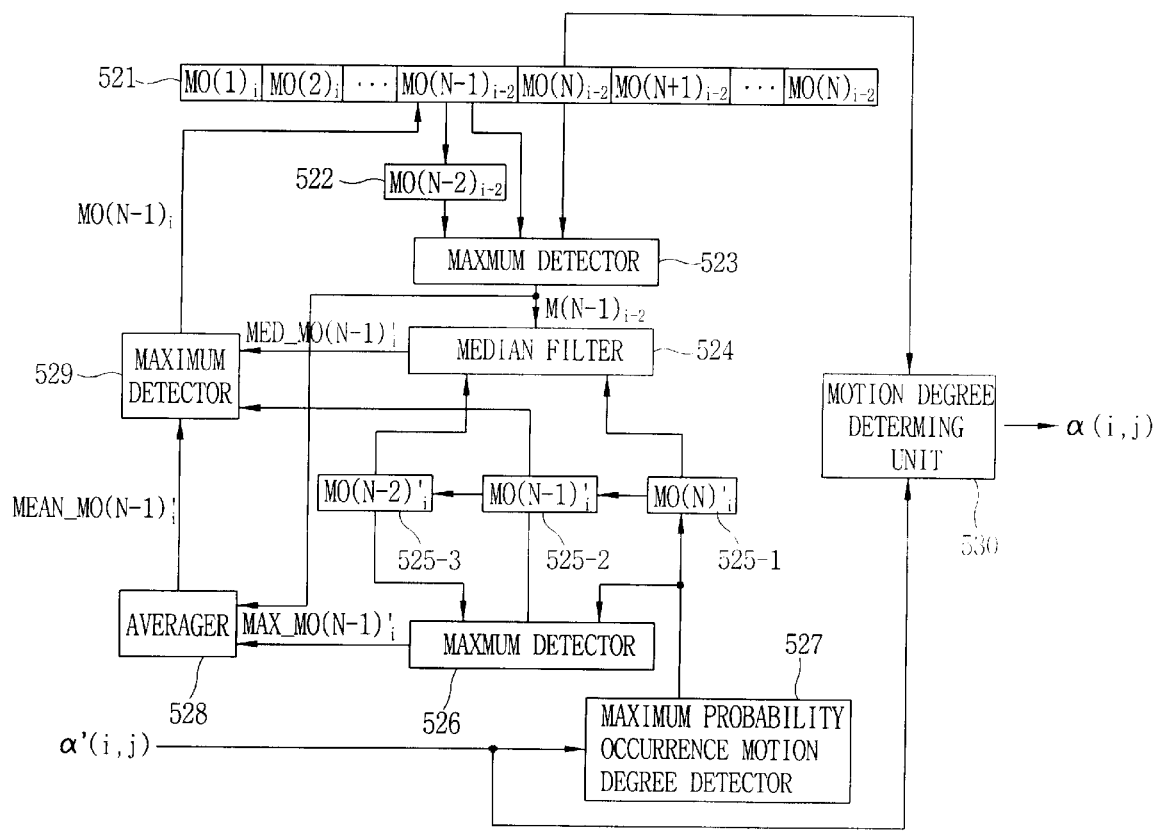
FIG. 8 illustrates blocks of a vertical direction expander of FIG. 6 in accordance with the embodiment of the present invention.

FIG. 7 illustrates N region division of a certain line in accordance with the embodiment of the present invention.

FIG. 8 illustrates blocks of the vertical direction expander of FIG. 6 in accordance with the embodiment of the present invention..

As depicted in FIG. 8, the vertical direction expander 520 comprises a register 521 for storing a certain line 1H divided evenly with N region, a motion degree determining unit 530 for outputting finally a maximum value or an average value as a motion degree value ($\alpha(i,,j)$) by comparing the motion degree value ($MO(N)_{i-2}$) of the former line about the pertinent region (N) stored on the register 521 and an output value ($\alpha, (i, j)$) of the horizontal direction expander 510, a register 522 for storing the motion degree value ($MO(N)_{i-2}$) of the former line about the pertinent region (N-2) stored on the resister 521, a maximum value detector 523 for finding the maximum value ($MO(N)_{i-2}$) among the motion degree value ($MO(N-2)_{i-2}$) on the register 522 and the motion degree values ($MO(N-1)_{i-2}$), ($MO(N)_{i-2}$) of the former line stored on the register 521, a maximum probability occurrence motion degree detector 527 for finding the motion degree value ($MO(N)'i$) from the output value ($\alpha'(i, j)$) of the horizontal direction expander 510, registers (525-1~525-3) for storing the each motion degree value ($MO(N)'$), ($MO(N-1)'_i$), ($MO(N-2)'_i$) about the present region (N) and former regions (N-1), (N-2) detected on the maximum probability occurrence motion degree detector 527, a maximum value detector 526 for finding the maximum value ($MAX\_MO(N-1)'_i$) among the motion degree values ($MO(N)'_i$) ($MO(N-2)'_i$) stored on the registers 525-1, 525-3, a median filter 524 for finding an intermediate value ($MED\_MO(N-1)'_i$) with inputs of the maximum value of the motion degree values ($MO(N)'_i$) ($MO(N-2)'_i$) on the registers 525-1, 525-3 and the maximum value ($MO(N-1)'_{i-2}$) of a representative motion on the maximum value detector 523, an averager 528 for finding an average value ($MEAN\_MO(N-1)'_i$) with inputs of the output values ($MO(N-1)'_{i-2}$) ($MAX\_MO(N-1)'_i$) of the maximum value detectors 523, 526, and a maximum value detector 529 for finding the final representative motion degree value ($MO(N-1)_i$) of the former region of the present region by finding the maximum value among the output values ($MEAN\_MO(N-1)'_i$) ($MED\_MO(N-1)'_i$) ($MO(N-1)'_i$) of the averager 528, median filter 524 and register 525-2.

The operation process of the vertical direction expander 520 will now be described in detail by dividing into two modes such as the output mode and detection/storing mode.

First, in the output mode, a certain line 1H is evenly divided into N number region, and the motion degree of the each region of the former interpolated line of the present line to be interpolated is stored on the register 521.

After that, the motion degree determining unit 530 outputs the maximum value by comparing the stored motion degree value ($MO(N)_{i-2}$) about the former line of the region (N) and output value ($\alpha'(i, j)$) of the horizontal direction expander 510 with a below Equation 1 or outputs an average value of the values ($MO(N)_{i-2}$, $\alpha'(i, j)$) with a below Equation 2.

$$\alpha(i, j) = Max\{MO(N)_{i-2}, \alpha'(i, j)\} \qquad \text{[Equation 1]}$$

$$\alpha(i, j) = \frac{(MO(N)_{i-2} + \alpha'(i, j)}{2} \qquad \text{[Equation 2]}$$

Herein, the average value is the final motion degree ($\alpha(i, j)$), and it is outputted to the soft switch 600.

In addition, it can be described as a below program.

IF ($\alpha'(i, j) > MO(N)_{i-2}$) THEN $\qquad \alpha(i, j) = \alpha'(i, j)$

ELSE $\qquad \alpha(i, j) = \frac{(MO(N)_{i-2} + \alpha'(i, j)}{2}$

ENDIF

Herein, the i describes the present line to be interpolated, the (i, j) describes the jth pixel on the ith line. Herein, the j is comprised in the Nth region.

For example, the maximum value output is set when a user wants quick motion expansion or the average value output is set when the user wants slow motion expansion.

In addition, the detection/storing mode is proceeded as below.

First, the maximum value detector 523 finds the maximum value $(M(N-1)_{i-2})$ with inputs $(MO(N-2)_{i-2})$ $(MO(N-1)_{i-2})$ $(MO(N)_{i-2})$ of the region (N-1) to renew the present representative motion degree of the former line stored on the registers 521, 522 and the former region (N-2), the representative motion degree of the after region (N), and outputs it to the median filter 524 and averager 528.

It can be described as below Equation 3.

$$M(N-1)_{i-2} = Max\{MO(N-2)_{i-2}, MO(N-1)_{i-2}, MO(N)_{i-2}\} \quad \text{[Equation 3]}$$

Meanwhile, the maximum probability occurrence motion degree detector 527 finds the maximum probability occurrence motion degree $(MO(N)'_i)$ from the output value of the output value $(\alpha'(i, j))$ of the horizontal direction expander 510, and stores it on the register 525-1.

In addition, the maximum probability occurrence motion degree detector 527 shifts sequentially the value stored on the register 525-1 to the registers 525-2, 525-3, accordingly the motion degree value $(MO(N-1)'_i)$ is stored on the register 525-2.

Herein, the motion degree value $(MO(N-1)'_i)$ is a value having the most high occurrence probability detected about the region to renew the representative motion degree of the present line to be interpolated.

In addition, the motion degree values $(MO(N-2)'_i)$ $(MO(N)'_i)$ having the most high occurrence probability detected on the former and after region of the present region to renew the present representative motion degree are stored on the registers 525-3, 525-1.

After that, the median filter 524 finds a median filtering value $(MED\_MO(N-1)'_i)$ by performing a below Equation 4 with inputs of the motion degree value $(M(N-1)'_{i-2})$ found on the maximum value detector 523 and the motion degree values $(MO(N)'_i)$ $(MO(N-2)'_i)$ stored on the registers 525-1, 525-3.

$$MED\_MO(N-1)'_i = MEDIAN\{MO(N-2)'_i, M(N-1)_{i-2}, MO(N)'_i\} \quad \text{[Equation 4]}$$

In addition, the maximum value detector 526 finds the maximum value $(MAX\_MO(N-1)'_i)$ of the found motion degrees by performing a below Equation 5 with inputs of the motion degree values $(MO(N-2)'_i)$ $(MO(N)'_i)$ stored on the registers 525-1, 525-3.

$$MAX\_MO(N-1)'_i = MAX\{MO(N-2)'_i, MO(N)'_i\} \quad \text{[Equation 5]}$$

Herein, the averager 528 finds the average value $(MEAN\_MO(N-1)'_i)$ of the motion degree by performing a below Equation 6 with inputs of the motion degrees $(M(N-2)_{i-2})$ $(MAX\_MO(N-1)'_i)$ found on the maximum value detectors 523, 526.

$$MEAN\_MO(N-1)'_i = \frac{(M(N-1)_{i-2} + MAX\_MO(N-1)'_i)}{2} \quad \text{[Equation 6]}$$

According to this, the maximum value detector 529 finds the maximum value by performing a below Equation 7 with inputs of the average value $(MEAN\_MO(N-1)'_i)$ on the averager 528, output value $(MED\_MO(N-1)'_i)$ on the median filter 524 and motion degree value $(MO(N-1)'_i)$ stored on the register 525-2.

$$MO(N-1)_i = Max\{MO(N-1)'_i, MED\_MO(N-1)'_i, MEAN\_MO(MO(N-1)'_i)\} \quad \text{[Equation 7]}$$

The maximum value by the Equation 7 is the final representative motion degree value $(MO(N-1)_i)$ of the region to renew the present representative motion degree, and the value i is stored on the register 521.

Accordingly, the present invention can perform more improved stable interpolation in accordance with the motion degree by performing more efficient vertical direction motion expansion function with a simple hardware by implementing the vertical direction expander 520 as above.

After that, the soft switch 600 is inputted the mapped motion degree yielded from the motion degree determining unit 200, and outputs an interpolation value by calculating the intra-field interpolation pixel value considering the edge direction yielded from the spatial interpolator 300 by referring the motion degree value $(\alpha(i, j))$ outputted from the motion expander 500 and the field average value yielded from the temporal interpolator 800.

The soft switch 600 outputs an operation value as a below Equation 8.

$$p(i, j, N) = \alpha p_e(i, j, N) + (1 - \alpha) \frac{p(i, j, N-1) + p(i, j, N+1)}{2} \quad \text{[Equation 8]}$$

Herein, the $p_e(i, j, N)$ is an output value of the spatial interpolator, and the $$\frac{p(i, j, N-1) + p(i, j, N+1)}{2}$$

is an output value of the temporal interpolator.

In addition, $\alpha$ is the motion degree value outputted from the motion expnader 500, and it range is $0 \leq \alpha < 1$.

According to this, the vertical line converter 700 converts the number of vertical line of the present field picture in order to generate an interpolation line appropriate to a display apparatus by referring the interpolation value outputted from the soft switch 600 and the present field data values stored on the field storing unit 100.

In the Meantime, when only the deinterlaced frame data is needed without the vertical line conversion, the vertical line converter 700 of the present invention passes and outputs the values outputted from the field storing unit-100 and soft switch 600 as it is.

As described above, the deinterlacing apparatus in accordance with the present invention can improve the image quality by performing more accurate motion detection and more stable and improved interpolation on the comparison with the conventional deinterlacing apparatus.

In addition, the deinterlacing apparatus in accordance with the present invention can reduce a manufacture cost of a circuit to be implemented by simplifying the circuit.

What is claimed is:

1. A deinteracing apparatus, comprising:
    a spatial interpolator for yielding an intra-field interpolation pixel value with inputs of a pixel value of field data of a region presently interpolated and intra-field perimeter pixel value from a first field data;
    a temporal interpolator for yielding a field average value about a field picture to be interpolated by averaging a pixel value of the former field and a pixel value of the after field;
    a motion determining unit for yielding a motion degree value by yielding and comparing the BD (Brightness Difference) and BPPD (Brightness Profile Pattern Difference) of the first field data;

a motion expander for diffusing the motion degree yielded on the motion determining unit to the horizontal direction and vertical direction perimeter pixels hierarchically;

a soft switch for outputting an interpolation value by computing the interpolation pixel value yielded from the spatial interpolator and field average value yielded from the temporal interpolator in accordance with the motion degree value of the motion expander; and a vertical line converter for converting the number of vertical lines of a present field data so as to be appropriate to display by referring the computed interpolation value and the first field data value.

2. The deineracing apparatus according to claim 1, wherein deineracing apparatus further comprises a field storing unit for storing temporal consecutive former two field data, present one field data and next one field data centering around the present field data, namely, total four field data.

3. The deineracing apparatus according to claim 1, wherein the motion determining unit comprises:

a BD/BPPD finder for yielding a BP and a BPPD by detecting the BD and BPPD of the first field data and comparing the BD and BPPD between the former field and after field centering around the present field data; and a BD/BPPD combiner for determining a motion degree value by mapping with a preset value when the BD and BPPD are more than a preset threshold value.

4. The deineracing apparatus according to claim 3, wherein the BD/BPPD combiner comprises:

a low pass filter for removing high frequency noise element by performing separately low-pass filtering of the BD ($BD_U$) ($BD_C$) ($BD_L$);

a first maximum value detector for detecting a first maximum value among the output signals of the low pass filter;

a first mapper for mapping the first maximum value with a preset value when the first maximum value is more than the preset threshold;

a second maximum value detector for detecting a second maximum value among the BPPD ($BPPD_U$) ($BPPD_C$) ($BPPD_L$);

a second mapper for mapping the second maximum value with a preset value when the second maximum value is more than the preset threshold; and a third maximum value detector for determining the motion degree value by selecting a third maximum value among the output signals of the first and second mappers.

5. The deineracing apparatus according to claim 4, wherein the BD/BPPD combiner further comprises a low pass filter for performing low pass filtering of the BPPD ($BPPD_U$) ($BPPD_C$) ($BPPD_L$).

6. The deineracing apparatus according to claim 4 or 5, wherein the deinterlacing apparatus comprises three low pass filters.

7. The deineracing apparatus according to claim 1, wherein the motion expander comprises a median filter for grouping the region where the motion degree value exists after removing noise element included in the motion degree value.

8. The deineracing apparatus according to claim 7, wherein the motion expander further comprises:

a horizontal direction expander for expanding the motion degree value to the other pixel adjacent to the pixel having motion to the horizontal direction with input of the output value of the median filter; and a vertical direction expander for expanding the motion degree value to the other pixel adjacent to the pixel having motion to the vertical direction.

9. The deineracing apparatus according to claim 8, wherein the vertical direction expander compares the motion degree value of the former line of a certain line which is evenly divided into N number region and motion degree value expanded on the horizontal direction expander, and outputs a maximum value or average value as the final motion degree value.

10. The deineracing apparatus according to claim 9, wherein the vertical direction expander comprises:

a motion degree determining unit for storing 1H field of a certain line evenly divided into N region, comparing the motion degree value ($MO(N)_{i-2}$) of the former line of the stored pertinent region (N) and the output value ($\alpha'(i, j)$) of the horizontal direction expander, and outputting finally the maximum value or average value as the motion degree value ($\alpha(i, j)$);

a first maximum value detector for finding the maximum value ($M(N-1)_{i-2}$) among the motion degree value ($MO(N-2)_{i-2}$) of the former line of the other stored pertinent region (N-2) and the motion degree values ($MO(N-1)_{i-2}$) ($MO(N)_{i-2}$) of the stored former line;

a motion degree detector for finding the motion degree value ($MO(N)'_i$) from the output value ($\alpha(i, j)$) of the horizontal direction expander;

a second maximum value detector for finding the maximum value ($MAX\_MO(N-1)'_i$) among the motion degree values ($MO(N)'_i$) ($MO(N-1)'_i$) ($MO(N-2)'_i$) of the present region (N) and former regions (N-1) (N-2);

a median filter for finding an intermediate value ($MED\_MO(N-1)'_i$) with inputs of the motion degree values ($MO(N)'_i$) ($MO(N-2)'_i$) and maximum value ($MCN-1)_{i-2}$;

an averager for finding an average value ($MEAN\_MO(N-1)'_i$) with inputs of output values ($M(N-1)'_{i-2}$) ($MAX\_MO(N-1)'_i$); and a third maximum value detector for finding the final motion degree value ($MO(N-1)'_i$) by finding the maximum value among the average value ($MEAN\_MO(N-1)'_i$), intermediate value ($MED\_MO(N-1)'_i$) and motion degree value ($MO(N-1)!_i$).

11. The deineracing apparatus according to claim 10, wherein the 1H field of the certain line is stored on a first register.

12. The deineracing apparatus according to claim 10, wherein the motion degree ($MO(N)_{i-2}$) of the former line of the other stored pertinent region (N-2) is stored on a second register.

13. The deineracing apparatus according to claim 10, wherein the motion degree values ($MO(N)'_i$) ($MO(N-1)'_i$) ($MO(N-2)'_i$) are separately stored on a third~fifth registers.

14. The deineracing apparatus according to claim 10, wherein the second maximum value detector finds the maximum value ($MAX\_MO(N-1)'_i$) among the motion degree values ($MO(N)'_i$) ($MO(N-2)'_i$).

* * * * *